Jan. 19, 1971 — R. EPAIN ET AL — 3,555,607
APPARATUS FOR GENERATING HIGH PRESSURES
Filed Aug. 17, 1967 — 7 Sheets-Sheet 1
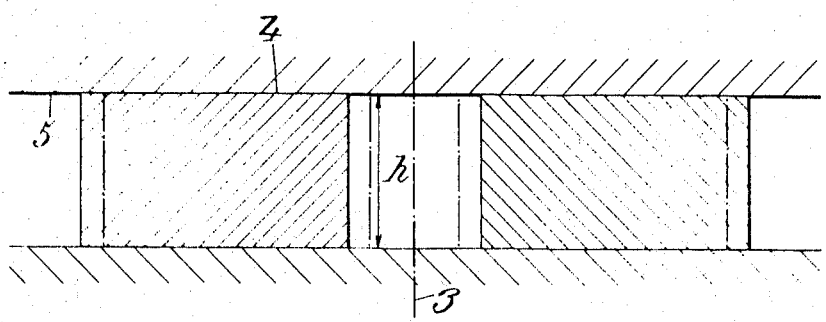
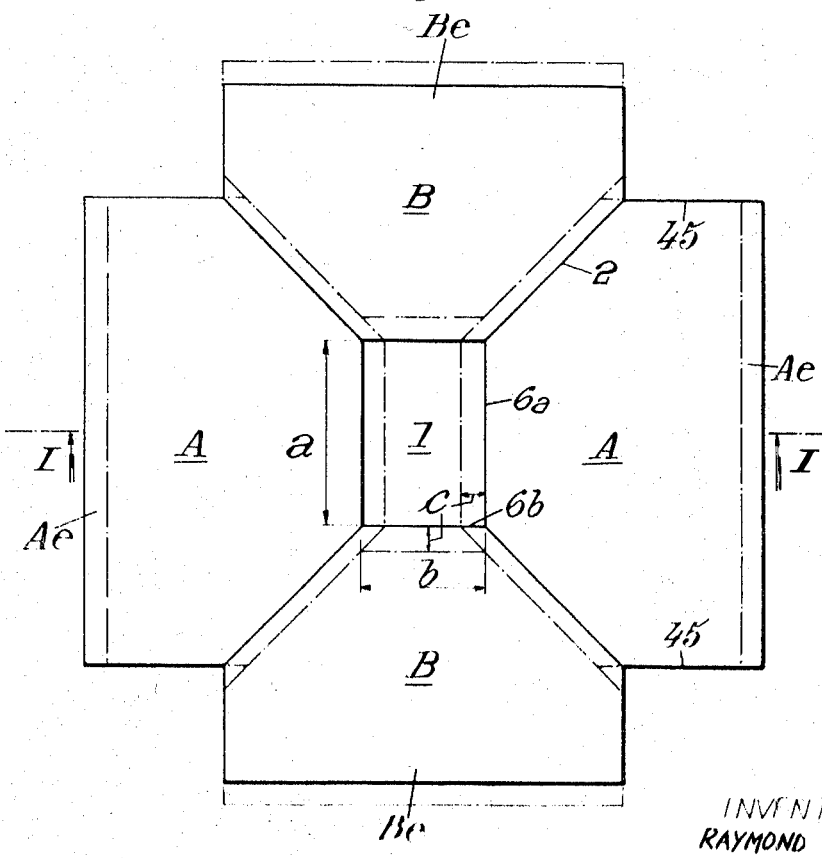
INVENTORS
RAYMOND EPAIN,
CHRISTIANE SUSSE and BORIS VODAR
BY McClure & Weiser
ATTORNEYS 3,555,607
APPARATUS FOR GENERATING HIGH PRESSURES
Raymond Epain, Antony, Boris Vodar, Issy-les-Moulineaux, and Christiane Susse, Bellevue, France, assignors to Centre National de la Recherche Scientifique, Paris, France
Filed Aug. 17, 1967, Ser. No. 661,357
Claims priority, application France, Aug. 22, 1966, 73,789
Int. Cl. B25c 3/00
U.S. Cl. 18—16                                                   6 Claims

ABSTRACT OF THE DISCLOSURE

The apparatus comprises a plurality of wedges having surface delimiting, at least in part, a closed space in which some material is placed to be compressed. The wedges are contiguous with each other along contact faces, and are able to move relative to each other by sliding of these contact faces on each other, to reduce the volume of the closed space. The wedges mutually support each other along these contact faces. The contact faces of each wedge diverge towards the exterior of the apparatus by a distance sufficiently large so that the exterior portions of these wedges which are not mutually supported have dimensions sufficient to withstand the stresses applied during operation.

---

The present invention relates to new apparatuses capable of subjecting materials to very high static pressures, of the type in which these materials are enclosed in a tight manner, from the beginning of the operation of compression, in an enclosed space delimited by portions of surfaces, at least a part of these portions of surfaces being carried by movable pieces forming the pressure transmission elements of the apparatus.

The simplest apparatus of this type comprise a piston and cylinder. These apparatuses comprise principally a right cylinder (or a corresponding right element whose interior surface is generated by a straight line moving parallel to itself around a base other than circular, for example square, elliptical, etc.) cooperating with at least one piston of corresponding cross-section for imprisoning in a tight manner the sample to be compressed.

The limit value of the pressure reached in such apparatuses, theoretically independent of the volume of the sample to be compressed, is nevertheless relatively low by reason of the distribution of the stresses throughout the entire mass of the piston, these stresses then causing the rupture, in particular of the exterior part of the piston, not supported by the walls of the cylinder, when a force is applied to the piston tending to subject the compressed sample to a pressure exceeding the above mentioned limit value.

A certain number of apparatuses are already known for generating high pressures, of more complex construction, which uses wedges, at least some of which are movable. These wedges have front faces surrounding a central space in which the sample of the material to be compressed is introduced.

In the most commonly used apparatuses using movable wedges, free lateral spaces remain which extend from the central space towards the exterior, between the lateral faces of these wedges, these lateral faces diverging towards the exterior. The relative displacements of the wedges towards the central space, at least during the first part of these displacements, causes an extrusion of some of the material from the central space into these lateral spaces. In such an apparatus, the compression of the material in the central space only begins after an appreciable part of the material has escaped and at the moment when the thickness of the material filling the lateral spaces, in which this material then forms a joint between the wedges, has been reduced to the point of cutting off the extrusion.

The result is that the useful stroke of the movable pieces is extremely limited, so that this apparatus can only be used for creating high pressures in samples whose useful volume (when the extrusion ceases) is very small.

It has already been proposed, in order to avoid this extrusion of material during the first part of the relative displacements of the wedges of this type of apparatus, to provide each of these wedges with a projection blocking off one of these lateral spaces, this projection being carried by one of the lateral faces of the wedge being considered, in the region of its front face. This projection comprises a face which bears against the front face of a neighbouring wedge, so that the wedges thus modified define, from the beginning of the operation of compression, a closed space for the sample to be compressed.

This type of apparatus is thus characterized by the fact that there is no support of the wedges by their lateral surfaces, the wedges coming into mutual contact along their lateral faces only when the operation of compression is finished.

Besides the fact that the latitude of movement of the wedges in this type of apparatus still remains extremely limited by the actual construction of the apparatus, another disadvantage resides in the absence of mutual support of these wedges during their relative displacements.

It has thus been impossible, until now, to reconcile the apparently contradictory imperatives consisting, on the one hand, in assuring an appropriate support for all the pieces of the apparatus so that they can withstand the stresses which they undergo during the compression of the samples of matter enclosed in the closed space, and on the other hand, in giving the movable pieces a sufficient latitude of movement to permit an appreciable reduction of the volume of the material imprisoned in the closed space.

The chief object of the present invention is to mitigate these disadvantages, and to provide apparatuses for generating high pressures of the type in question which are more practical than the prior apparatuses, in particular with regard to their ability to compress samples of material of relatively large initial volume at high pressures, even higher than the pressures produced by most of the presently known devices.

This invention thus provides an apparatus which permits of subjecting material contained in a closed space of determined initial volume to very high pressures.

According to the present invention, this apparatus comprises, on the one hand, a plurality of wedges having surfaces delimiting, at least in part, the closed space mentioned above, these wedges presenting moreover faces in contact with faces of the contiguous wedges, and on the other hand, means, such as hydraulic jacks, adapted to apply to these wedges forces producing simultaneous relative displacements of these wedges with respect to each other in directions situated at least in one plane of the space, by sliding of their faces of contact on each other, these forces being oriented and the angles of the wedges chosen in such a manner that the resultant effect of these simultaneous relative displacements produces a reduction of the volume of the closed space, the wedges being guided in such a manner that their faces of sliding contact remain parallel to themselves during said relative displacements, and the zones of effective contact between the faces of sliding contact of contiguous wedges having dimensions such that these zones can extend towards the exterior by a distance sufficiently far from the closed space so that the exterior parts of the wedges, laterally not supported, have, in planes substantially transverse to the respective directions of displacement of the wedges, dimensions sufficient to permit them to resist the stresses to which they are subjected under the effect of these forces.

The use of the device according to the invention results in the fact that the space containing the sample to be compressed, which space is delimited at least partially by these wedges (the delimitation of the remaining surface being then assured by fixed pieces), remains closed in a tight manner during the simultaneous relative displacements of these wedges whose surfaces of sliding contact remain constantly applied against each other. Moreover, the use of this feature results in the mutual support of these wedges by the lateral compression which they exert on each other, along the entire zones of effective contact of the faces of contact between contiguous wedges; the exterior parts, not supported laterally, of these wedges have a cross-section sufficient to resist the stresses to which the wedges are subjected during operation of the apparatus.

Needless to say these wedges must obey certain geometric conditions so that, on the one hand, their surfaces of contact remain contiguous, and so that, on the other hand, the volume of the closed space containing the sample to be compressed decreases in the course of the simultaneous relative displacements of these wedges.

According to a supplementary characteristic, not absolutely necessary in all cases, but very advantageous, the major part of each of the wedges of the apparatus is entirely comprised in the portion of space delimited by its own planes of sliding with other wedges. Such a characteristic permits large relative displacements of the wedges, which are theoretically limited only by the extent of the respective faces of contact of the wedges, which results in the possibility of obtaining large reductions of the initial volumes, which are themselves large, of the material to be compressed.

The wedges are preferably formed of hard materials whose resistance to shearing increases with compression, such as tungsten carbides and the very hard similar materials, for the deliberate purpose of taking advantage of the considerable gain of mechanical resistance which the lateral compression gives to materials of this type.

Moreover, it is naturally advantageous that the coefficient of friction of the faces of the wedges sliding on each other is as low as possible.

These faces will be advantageously lubricated by the interposition, for example, of fine layers of lead, having in particular a thickness of 0.05 mm., or of layers of molybdenum sulphide, or again of films of Teflon.

The invention will in any case be well understood with the aid of the following description of particular embodiments of the invention, given merely by way of example, with reference to the accompanying drawings, in which:

FIG. 1 shows a vertical section through one embodiment of the apparatus according to the invention, comprising movable wedges delimiting a closed space containing the sample to be compressed and having surfaces of horizontal contact permitting them to be displaced by sliding between two terminal horizontal closing plates (section along the line I—I of FIG. 2);

FIG. 2 is a view from above of the apparatus of FIG. 1, without the terminal plates;

Figure 3:
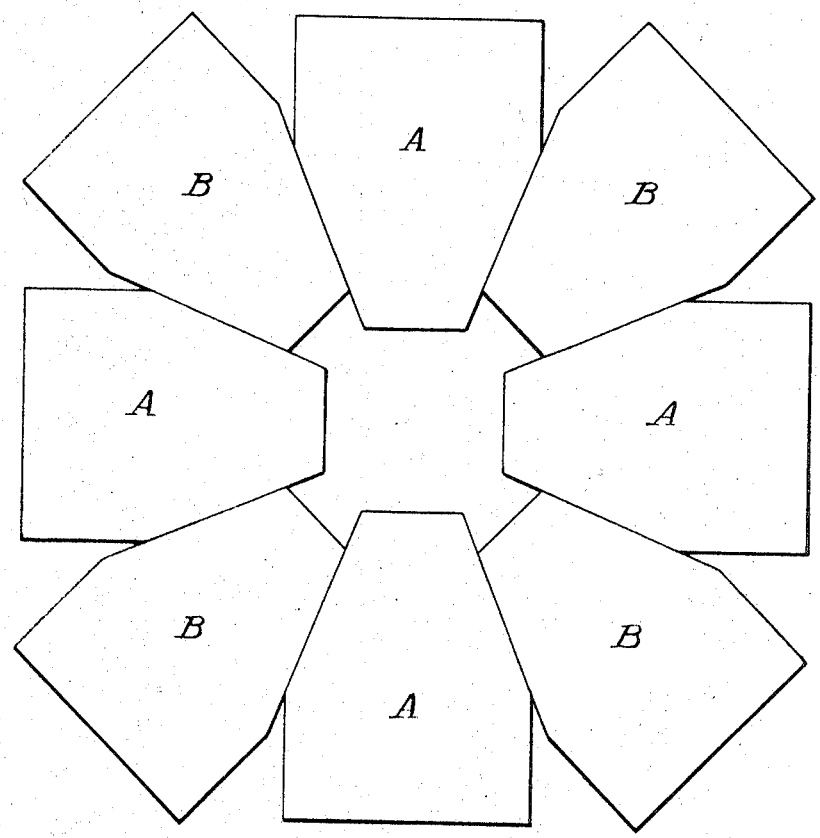
FIG. 3 is a view from above of a modification of the apparatus represented in FIG. 2.

According to the most general feature of the invention, the apparatus for subjecting a material contained in a closed space 1 of determined initial volume to very high pressures comprises a plurality of wedges having surfaces delimiting, at least in part, the closed space. These wedges have faces 2 in contact with the faces of the contiguous wedges. Means are provided, such as hydraulic jacks, adapted to apply to these wedges forces producing simultaneous relative displacements of these wedges with respect to each other in at least one plane of the space by sliding of their faces 2 of contact on each other. These forces are oriented and the angles of the wedges and their dimensions chosen in such a manner that the resultant effect of these simultaneous relative displacements produces a reduction of the volume of the closed space. These wedges are guided in such a manner that their faces of sliding contact remain constantly parallel to themselves in the course of these displacements and that the zones of effective contact between the faces of sliding contact between contiguous wedges extend far enough towards the exterior from the closed space so that the exterior parts of the wedges, laterally not supported, have, in planes substantially transverse to the directions of displacement of the wedges, dimensions sufficient to permit them to resist the lateral stresses to which they are subjected under the effect of these forces.

In numerous embodiments of the invention, the plurality of wedges of the apparatus for generating very high pressures form a first and a second group. The surfaces participating in the delimitation of the closed space and borne by the wedges A of the first group are adapted to advance towards the axis 3 or the center of the space, and the corresponding surfaces of the wedges B of the second group are adapted to move away from the axis 3 or the center, in the course of the simultaneous relative displacements of these wedges.

The displacements of the wedges of the first group and those of the wedges of the second group can take place along directions which are respectively contained either in a single plane or in different planes.

In the first case where the directions of displacements of the wedges of the first group and of the second group are situated in the same plane, preferably horizontal, called hereinafter "displacement plane" for convenience, the wedges A and the wedges B of these groups are disposed alternately among themselves (FIGS. 2 and 3) and have respectively polyhedral shapes distributed radially about the axis of the closed space 1 which they imprison. The faces 2 of sliding contact of these wedges which permit their simultaneous relative displacements with respect to each other are perpendicular to the displacements plane and tend to converge towards the axis of the closed space. These wedges are, moreover, in contact, by corresponding faces 4, with two terminal plates 5 parallel to the displacements plane of these wedges (FIG. 1), these terminal plates being gripped by a press and assuring the tight closing of the closed space.

The faces 2 of sliding contact of the wedges A and B respectively of the two groups are advantageously situated, as shown in the cases of FIGS. 2 and 3, in planes parallel to planes passing through the above mentioned axis, these latter planes forming in pairs among themselves equal angles. Each of these wedges has, moreover, a truncated face $6a$ or $6b$ in contact with the compressed material and appreciably perpendicular to the direction of displacement of the wedge being considered, the flats formed by the truncated faces $6a$ of the wedges A of the first group being larger than the flats formed by the truncated faces $6b$ of the wedges B of the second group. It will easily be noted that in the case of FIGS. 2 and 3 the wedges A of the first group (whose initial position is represented in solid lines) can move towards the axis of the closed volume (to occupy a position shown in dashed lines) at the price of a displacement of the wedges B (whose initial position is represented in solid lines) moving them away from this axis (to occupy a position shown in dashed lines), the surfaces of contact of the wedges A and B remaining contiguous in the course of their simultaneous relative displacements.

In the device represented in FIG. 2, the faces of sliding contact of the wedges A and B are advantageously situated in planes remaining parallel to radial planes perpendicular to each other forming angles of 45° with the directions of the respective displacements of the wedges A and B of the apparatus.

The truncated faces of the wedges A and B in the device of FIG. 2 are rectangular, the dimension $a$ of the sides parallel to the terminal plates 5 of the truncated rectangular face $6a$ of the wedges A being greater than the corresponding dimension $b$ of the sides of the truncated faces $6b$ of the wedges B. This difference of dimensions, not absolutely necessary, is advantageous due to the fact that it permits of obtaining a smaller overall deformation of the volume of the material than when $a$ equals $b$, for the same reduction of volume.

If $h$ is the height (FIG. 1) separating the two terminal plates, the initial volume of the closed space 1 is equal to $Vi=abh$ (supposing that the edges, perpendicular to the displacements plane, of the truncated faces $6a$ and $6b$ are coincident, as shown, for the initial position of the wedges A and B). The volume of the final closed space enclosing the sample, after a displacement $c$ of the wedges A towards the axis of the wedges B in the opposite direction, becomes finally equal to $V_f=Vi-2c(a-b+c)h$, that is to say smaller since the sum $a+c$ is greater than $b$, which results in the possibility of a considerable increase of pressure in the sample (it being noted that the displacement $c$ is in general very small).

Needless to say the real displacements of these wedges relative to each other are small in the case of materials which are not very compressible, but these displacements have been enlarged for the purposes of the drawing.

Similarly, the closed spaces envisaged have volumes which are in reality very small with respect to the volumes of the compression wedges.

The apparatus shown in FIG. 3 follows the same principle of operation, each of the first and second group comprising respectively four wedges alternating with those of the other group. In this case, the respective sliding faces 2 of these wedges then remain situated in planes parallel to the radial planes forming in pairs angles of 45°.

Means for exerting forces capable of permitting respective displacements of different wedges are advantageously formed by hydraulic jacks (represented schematically in FIG. 4 by pistons 7) rigid with the same frame (not shown). The forward and backward movements of the respective wedges are advantageously synchronized by auxiliary mechanical devices superimposed on the jacks, this synchronization being relatively simple so long as the respective displacements of the wedges of each of the groups are in a constant ratio.

Concerning the problem of guiding of each of the wedges of the apparatus, according to the embodiments which have just been described, it is apparent in the figures that the sliding contact faces contribute in an effective manner to this guiding, in view of the large size of their surface areas with respect to the surface areas, enlarged for the purposes of illustration in the figures, of the surfaces of the wedges in contact with the sample of material to be compressed in the closed space. The exterior parts of the wedges being considered can, in particular when the angles formed by the planes of sliding contact of the same wedge are large, comprise surfaces 45 parallel to their directions of displacement (FIG. 2), these surfaces 45 cooperating with guiding surfaces (not shown).

The terminal plates 5, cooperating with the wedges A and B of the two groups in order to complete the delimitation of the closed volume, are themselves applied under pressure against the lower and upper faces of the wedges under the action of hydraulic presses exerting their action in the direction of the axis of the closed space.

The terminal closing plates used in these apparatuses must also resist the high pressure generated by the relative displacements of the wedges, in particular in the zone, where they are in direct contact with the compressed sample. Moreover, they must exert a sufficient contact pressure on the horizontal faces 4 of the wedges movable with respect to each other, in particular in the regions of these faces 4 situated in the neighbourhood of the faces $6a$ and $6b$ of these wedges. In these regions, the wedges no longer mutually support each other except in two directions of the space, and it is the terminal plates which must assure the complementary support which will permit of maintaining in these regions the state of triaxial constraint for avoiding any local plastic deformation of these wedges.

In the case where the terminal plates are formed in monoblocs, these plates can be constrained, where appropriate, and the constraining means used can themselves be self-constraining.

Figure 4:
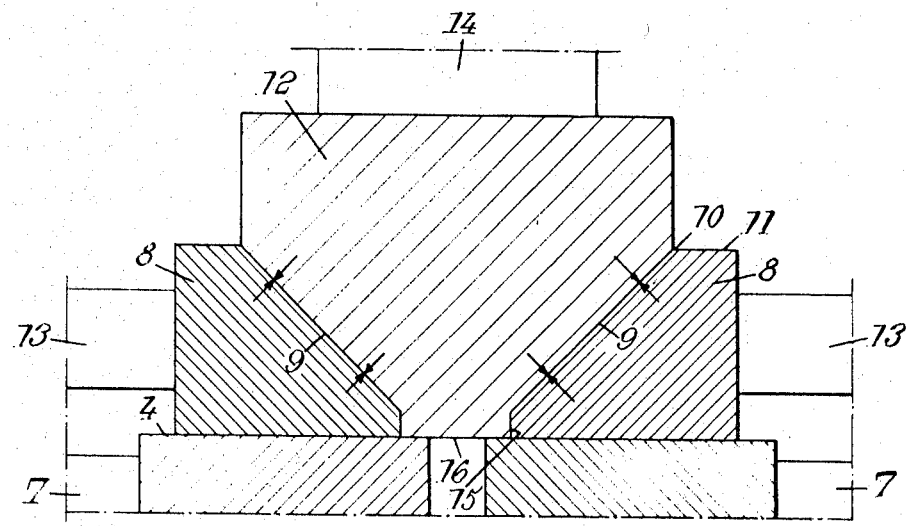
FIG. 4 is a section of an apparatus according to the invention through a vertical plane, showing a particular embodiment of one of the terminal plates, this plate comprising a plurality of fixed wedges having inclined surfaces, and a central piece having a conical or pyramidal end complementary to and applied against these inclined surfaces.
Figure 5:
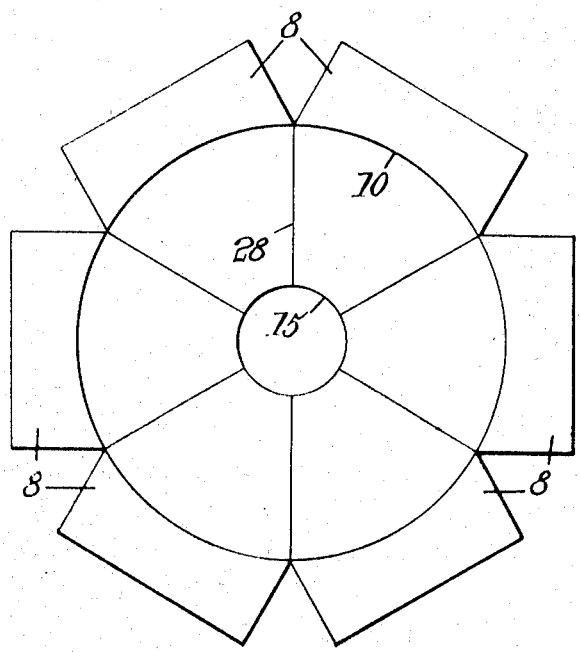
FIG. 5 is a view from above the terminal plate of FIG. 4, with the central piece removed.

However better distribution of the stresses inside these terminal plates will be obtained by forming them, according to a supplementary characteristic of the invention, on the one hand, by a certain number of fixed contiguous wedges 8 disposed according to a crown as shown in FIG. 5 and having inclined surfaces 9 which together define a conical or pyramidal surface (whose line of intersection with the upper faces 11 of the fixed wedges 8 is represented at 10 in FIG. 5), and on the other hand, by a central piece 12 having a conical or pyramidal surface, complementary to the surfaces 9 and applied against these surfaces under the effect of a press. The arrangement of the means for applying thrust to these wedges has been represented very schematically in FIG. 4. These means can be formed by jacks represented schematically by pistons 13 for the fixed wedges and 14 for the complementary central piece 12, all these devices being advantageously rigid with the same frame (not shown). The advantages of rendering all the thrust means rigid with the same frame will be described later on in relation to another embodiment of the invention.

Moreover, the fixed wedges of the above mentioned crown advantageously have other truncated surfaces 15 (in the neighbourhood of the movable wedges A and B and of the closed space 1), the directrix of these surfaces being substantially parallel to the axis of the closed space. These truncated surfaces are sufficiently set back with respect to the surface 6a and 6b of the movable wedges A and B participating in the delimitation of this interior closed space for all relative positions of these wedges. These truncated surfaces 15 advantageously have an incurved shape and can for example, as shown in FIG. 5, have an overall cylindrical section.

The complementary piece mentioned above will thus comprise in this case a cylindrical end 16 projecting with respect to the pyramidal or conical surface of contact with the corresponding surfaces of the fixed wedges.

In this way, the truncated ends of the movable wedges remain always in contact with the cylindrical end of this complementary piece during their movements of simultaneous relative displacement.

The radial contact surfaces 28 of the wedges fixed among themselves are preferably situated in planes different from those containing the sliding contact faces 2 of the movable wedges.

The conical or pyramidal surface 9 formed by the fixed wedges 8 which are in contact with the central piece, on the one hand, and the plane faces of these fixed wedges in contact with the faces 4 of the movable wedges, on the other hand, play the same role as the sliding contact surfaces of the movable wedges, with regard to the distribution of tension in these different pieces. In particular, the fixed wedges bring to the central piece a supporting action which decreases from the interior towards the exterior, at the same time as they provide the plane faces 4 of the movable wedges which they limit on both sides of the closed space 1, with the support necessary for withstanding the longitudinal tensions produced in these movable wedges.

In the foregoing, the movable wedges were subjected to substantially radial forces, causing also substantially radial displacements, in one direction or the other, of the different movable wedges. The directions of application of these forces, can, however, in other embodiments of the invention be other than radial, if the wedges C (FIGS. 6 to 8) which are subjected to simultaneous relative displacements with respect to each other by sliding of their contact faces on each other, respectively have surfaces 17a participating in the delimitation of the closed space, these surfaces tending in the course of these displacements to move closer to the axis or the center of the sample. This is in particular the case when the different wedges $C_1$, $C_2$, $C_3$ . . . (hereafter designated collectively by "wedges C") are disposed around the axis of the sample and are subjected to displacements along directions which do not pass through the axis (directions which will be called hereafter "non radial"). These non radial displacements make a determined angle, the same for all the wedges, with the corresponding surfaces $17a_1$, $17a_2$ (hereafter designated collectively by "faces 17a"), which faces are parallel to the axis and participate in the delimitation of the closed space. The directions of these displacements are such that these surfaces move closer to this axis, and consequently, produce a reduction of volume of the closed space resulting in a considerable increase of pressure inside the sample compressed in this closed space.

Figure 6:
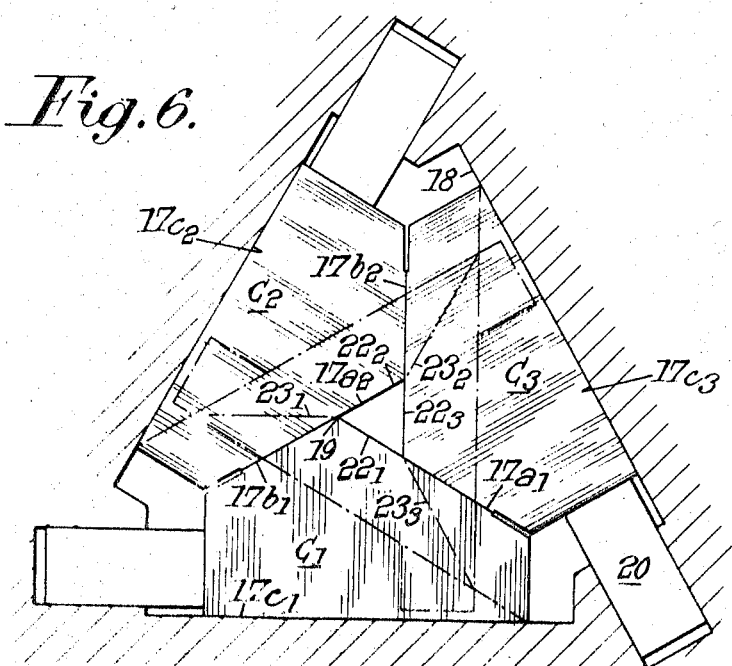
FIGS. 6 and 7 are sections through a horizontal plane of an apparatus comprising movable wedges according to another embodiment of the invention, these wedges occupying different relative positions of contact in these two figures.
Figure 7:
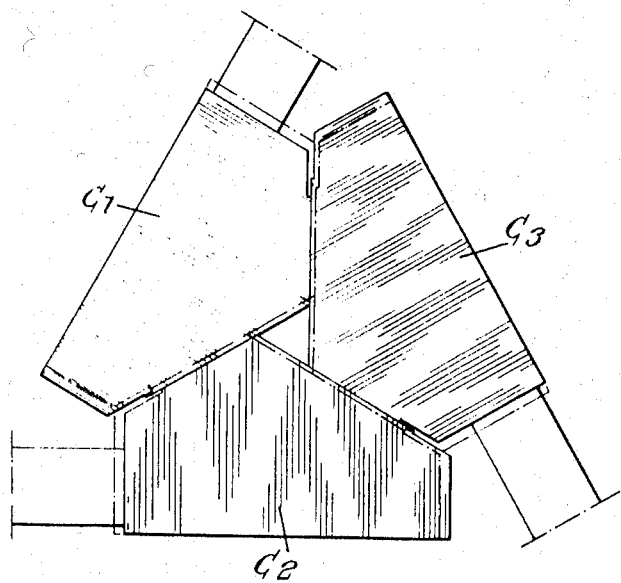
Figure 8:
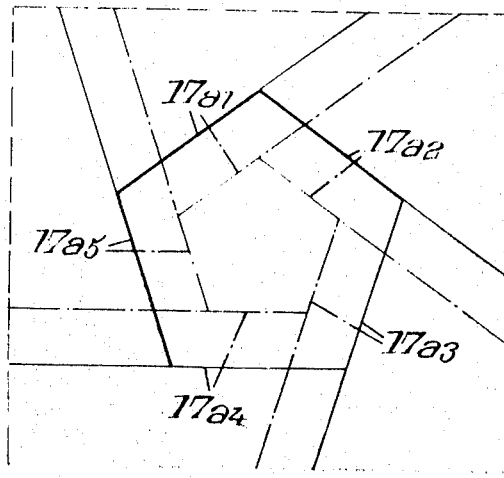
FIG. 8 is a view from above of a part of an apparatus forming a modification of construction, but whose principle of operation is analogous to that of the apparatus shown in FIGS. 6 and 7.
Figure 9:
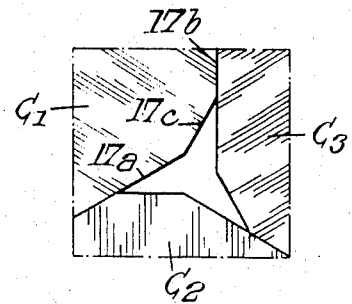
FIG. 9 is a partial section through a horizontal plane of a part of the apparatus of FIGS. 6 and 7, presenting however, a modification of construction.

FIGS. 6 and 8 represent an advantageous embodiment of the feature which has just been described in which the wedges C of the apparatus are disposed around the axis of the closed space and cooperate, moreover, by the intermediary of a face 17c, with guiding surfaces 18, one for each wedge, forming a prism whose axis coincides with the axis of this closed space. The faces of sliding contact of the wedges C with each other (two faces 17a and 17b per wedge) are contained in planes parallel to the planes bisecting the angles of the prism. The planes in which the contact faces 17 are contained intersect one another along a direction (the edge 19 of intersection of the faces 17a and 17b in the case of FIGS. 6 to 8) parallel to the axis of the closed space and situated at the same distance from the guiding face of the wedge being considered as this axis is. The forces, produced for example by jacks 20 and causing relative displacements of these wedges with respect to each other, are oriented substantially parallel to the guiding surfaces 18 and in the direction which tends to make the line of intersection of the contact faces 17a and 17b of the same wedge coincide with the axis of the polygon.

In FIGS. 6 and 7, a device of this type has been shown comprising three wedges cooperating with three guiding surfaces whose sections coincide with the three sides of an equilateral triangle. Each of the three wedges disposed radially about the axis of the equilateral triangle comprise, besides the face 17c adapted to slide against the above mentioned guiding surfaces, two faces 17a and 17b (contained in planes parallel to the plane bisecting the angles adjacent to the guiding surface being considered of the equilateral triangle mentioned above) in sliding contact with the faces of the contiguous wedges. The two sliding surfaces 17a and 17b of each of the wedges are contained in planes which intersect each other along an edge (represented by its dashed trace 19 in the plane of the figure) parallel to the axis. This edge moves in a plane containing the axis and parallel to the guiding surface of the corresponding wedge, when the wedges C execute their simultaneous relative movements under the effect for example of the jacks 20 acting in directions parallel to the guiding surfaces.

As can be seen in the drawings, the closed space in which the sample is adapted to be compressed is delimited laterally by a prism whose axis coincides with the axis of the guiding surfaces and whose section has the form of an equilateral triangle whose side dimensions tend towards zero in the course of the simultaneous relative displacements of the three wedges. In FIG. 7 these wedges have been shown in an initial position (in dashed lines) and in a final position (in solid lines) when they have undergone the simultaneous relative displacements tending to reduce the section of the closed space 1.

An apparatus can be constructed with a different numbzer of wedges (greater than two), by following the general conception of the embodiment of the invention discussed above.

FIG. 8 shows, by way of example, schematically the parts of the sliding surfaces $17a_1$ to $17a_5$ of five wedges of a device of the same type comprising, however, five wedges. The surfaces 17a define a closed space around a sample to be compressed having the form of a prism of regular pentagonal cross-section whose side dimension tends toward zero during simultaneous relative displacements of the five wedges, from an initial position (represented in solid lines) to a final position (represented in dashed lines).

In the foregoing, the only embodiments envisaged have been those in which the simultaneous relative displacements of the wedges take place only in directions contained in a single plane, the wedges subjected to these displacements being limited, on both sides of the plane in which these displacements take place, by plane surfaces cooperating with the fixed terminal plates.

Figure 10:
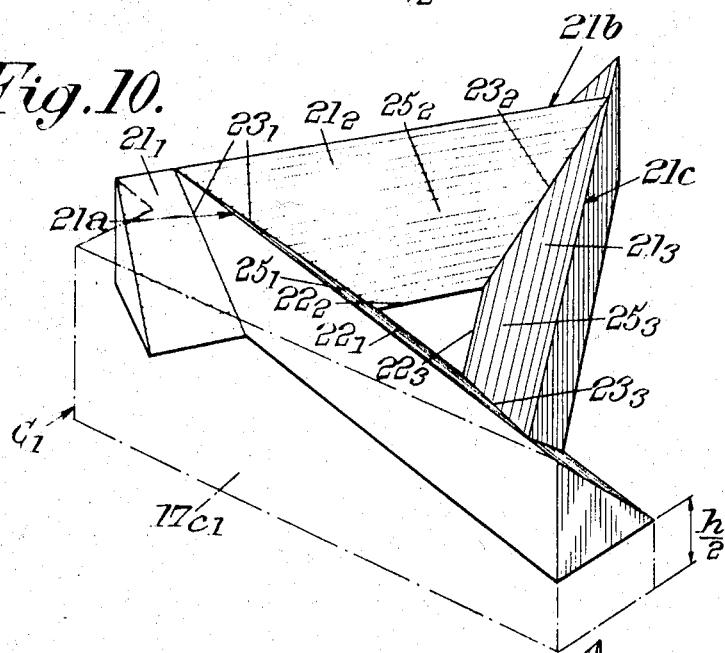
FIG. 10 is a perspective view of parts of wedges of an embodiment of the apparatus according to the invention, derived from that shown in FIGS. 6 and 7.
Figure 11:
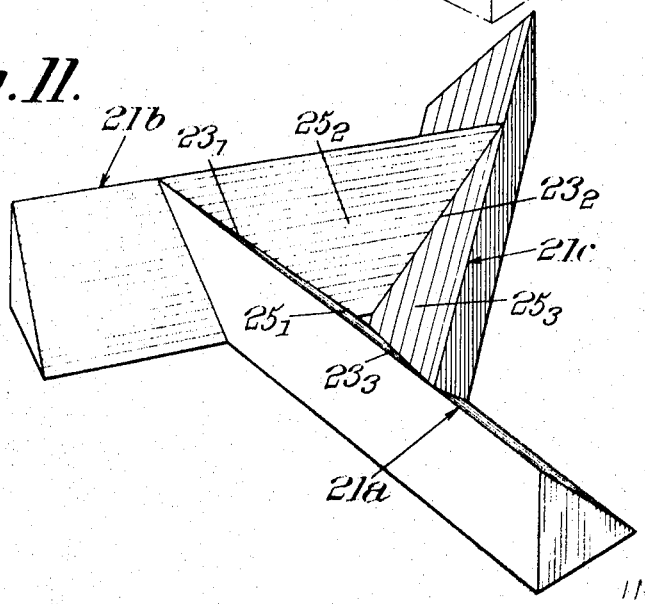
FIG. 11 is a perspective view of the upper parts of the wedges of the apparatus shown in FIG. 10 after a simultaneous relative displacement of these wedges.

The embodiments described in FIGS. 6 to 8 lend themselves well to the construction of an apparatus having a more complex spatial distribution, in particular in which the directions of displacement of the movable wedges are not all distributed in a single plane. The wedges of the devices of FIGS. 6 to 8 can have, on both sides of the plane of the displacement directions already envisaged for these wedges, faces inclined along an angle, identical for all the wedges, with respect to said plane (FIGS. 10 and 11). These wedges then have central prismatic portion having rectangular contact faces $17a_1$, $17a_2$ and $17a_3$, of height $h$ envisaged above, and upper and lower parts $21_1$, $21_2$ and $21_3$ symmetrical about planes containing the edges $22_1$, $22_2$ and $22_3$ of the rectangular faces parallel to the planes of the "non-radial" directions of displacements, these parts $21_1$, $21_2$ and $21_3$ comprising inclined faces $25_1$, $25_2$ and $25_3$ diverging from the edges $22_1$, $22_2$ and $22_3$ of the central prismatic portion in order to define a pyramidal cavity whose section in a plane perpendicular to the axis, is equilateral.

In FIGS. 10 and 11 the upper pyramidal parts $21a$, $21b$ and $21c$ of the three wedges C have only been shown in part and separated from the above mentioned prismatic parts, for convenience of the graphical representation. The graphical representation of one half-wedge C is however completed in dashed lines in FIG. 10. Like the prismatic parts of these wedges, the upper parts of each wedge have sliding contact faces defined by the directions of contact $23_1$, $23_2$ and $23_3$ visible in FIGS. 10 and 11, these faces remaining in tight contact during the relative displacement of these wedges, as was described above.

FIG. 10 represents the respective positions of the upper parts of the wedges in their initial position, whereas FIG. 11 represents the relative positions of these parts $21_1$, $21_2$ and $21_3$ at the end of this relative displacement.

In the course of these displacements, the interior inclined faces of these parts $21_1$, $21_2$ and $21_3$ remain parallel to themselves and the point of intersection of the interior traces $23_1$, $23_2$ and $23_3$ of intersection of the interior faces of the pyramidal cavity moves towards the exterior on the axis of the apparatus.

According to an advantageous characteristic of the invention, axial pyramidal pieces (not shown), which are complementary to the pyramidal cavities, are applied against these pyramidal cavities under the effect of exterior thrusts directed towards each other along the above mentioned axis. These pieces then move along directions coincident with the axis of the closed space, these pieces tending to move away from each other during relative displacemens of the wedges in the direction corresponding to the reduction of volume of the prismatic part of the closed space.

In this latter embodiment, the closed space is then delimited in its totality by surfaces borne by pieces driven in simultaneous relative movements with respect to each other.

Needless to say, the height of the prismatic part of the closed space delimited by the faces $17_1$, $17_2$ and $17_3$ of the wedges must be sufficient so that, during their relative movements in the direction for which the prismatic section of the closed space tends to decrease, the reduction of volume which results is greater than the corresponding increase of the volume of the closed space which comes from the moving away along the axis of the complementary pyramidal pieces applied on the faces $21_1$, $21_2$ and $21_3$ of the pyramidal cavities formed by the wedges C.

According to an advantageous supplementary characteristic of the embodiments which have just been described with reference to FIGS. 6 to 11, the prismatic parts of the wedges C advantageously comprise truncated or chamfered faces $17c$ extending between the contact faces $17a$, $17b$ of each of the wedges. These truncated faces appear in FIG. 9. This feature permits a more favorable distribution of the stresses produced in the regions near to the sample compressed in the prismatic parts of the wedges under the effect of the high pressure generated inside the closed space. These truncated or chamfered faces are preferably limited to the prismatic parts of the wedges, the parts defining the pyramidal cavities having their integral non truncated shape represented in FIGS. 10 and 11. These integral parts cooperate with the axial pyramidal pieces mentioned above which are adapted to move along the axis to assure a sufficient triaxial support of the different wedges in the neighborhood of the axial ends of the closed space, these wedges withstanding the pressures produced in the compressed sample.

It is apparent that what has just been described with respect to the devices comprising three wedges $C_1$, $C_2$ and $C_3$ surrounding the axis of the closed space can be quite naturally extended to devices comprising a greater number of wedges capable of displacements in "non-radial" directions.

In the foregoing, with respect to FIGS. 6 to 8, only the particular cases which seem to be most advantageous of the modes of construction of apparatuses for generating very high pressures according to the invention have been described, in which the movable wedges are subjected to displacements along non-radial directions.

Figure 14:
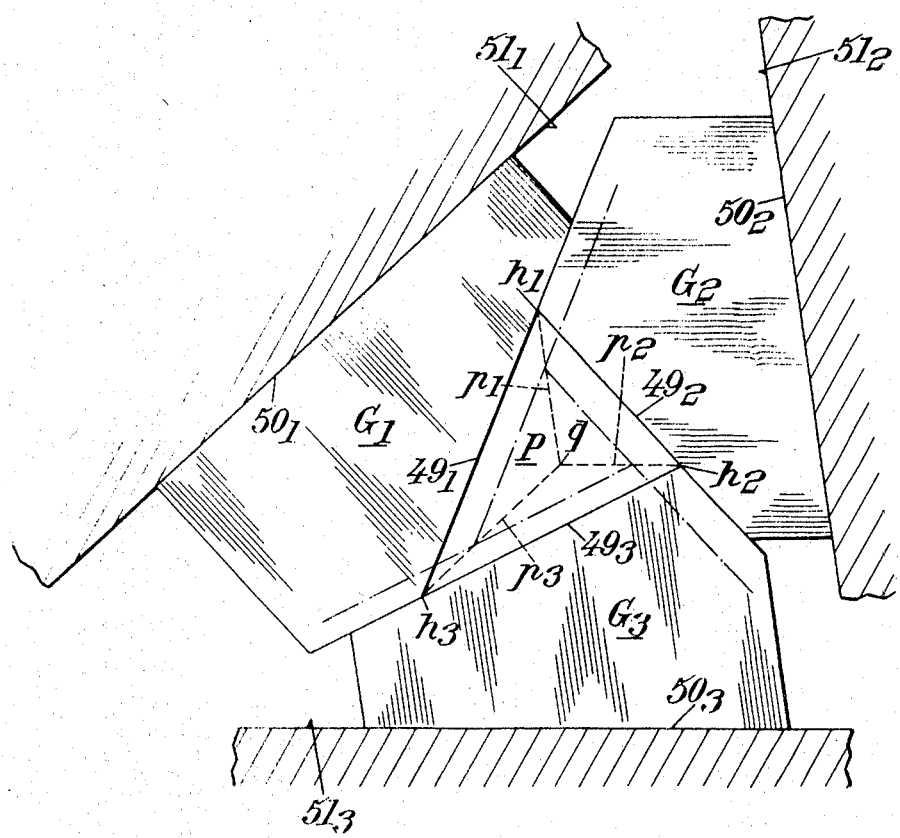
FIG. 14 is a schematic view from above of still another modification of the apparatus shown in FIGS. 6 and 7.

In a general manner, the apparatuses of this type can be formed with prismatic polyhedra or wedges having different right-cross-sections $G_1$, $G_2$, $G_3$ (FIG. 14) contiguous in pairs by the intermediary of sliding contact surfaces $49_1$, $49_2$ and $49_3$ contained in planes perpendicular to the plane of the displacement directions. The directions of intersection of these sliding contact surfaces are shown by their traces, $h_1$, $h_2$ and $h_3$ in the plane of FIG. 14 and define the edges of a prism P whose faces delimit, at least in part, the closed compression space. These wedges comprise, in addition, surfaces $50_1$, $50_2$ and $50_3$, one per wedge, cooperating with guiding surfaces $51_1$, $51_2$ and $51_3$ parallel to planes (shown by their traces $p_1$, $p_2$ and $p_3$ in the plane of FIG. 14) passing through the edges $h_1$, $h_2$ and $h_3$ of the prism P and converging on a common axis (trace $q$) inside the prism P. The directions of application of the forces producing simultaneous relative displacements of these wedges are such that they tend to bring the edges of the prism P into coincidence with the above mentioned common axis (the faces $49_1$, $49_2$ and $49_3$ coming for example to occupy the positions represented in dashed lines).

Figure 13:
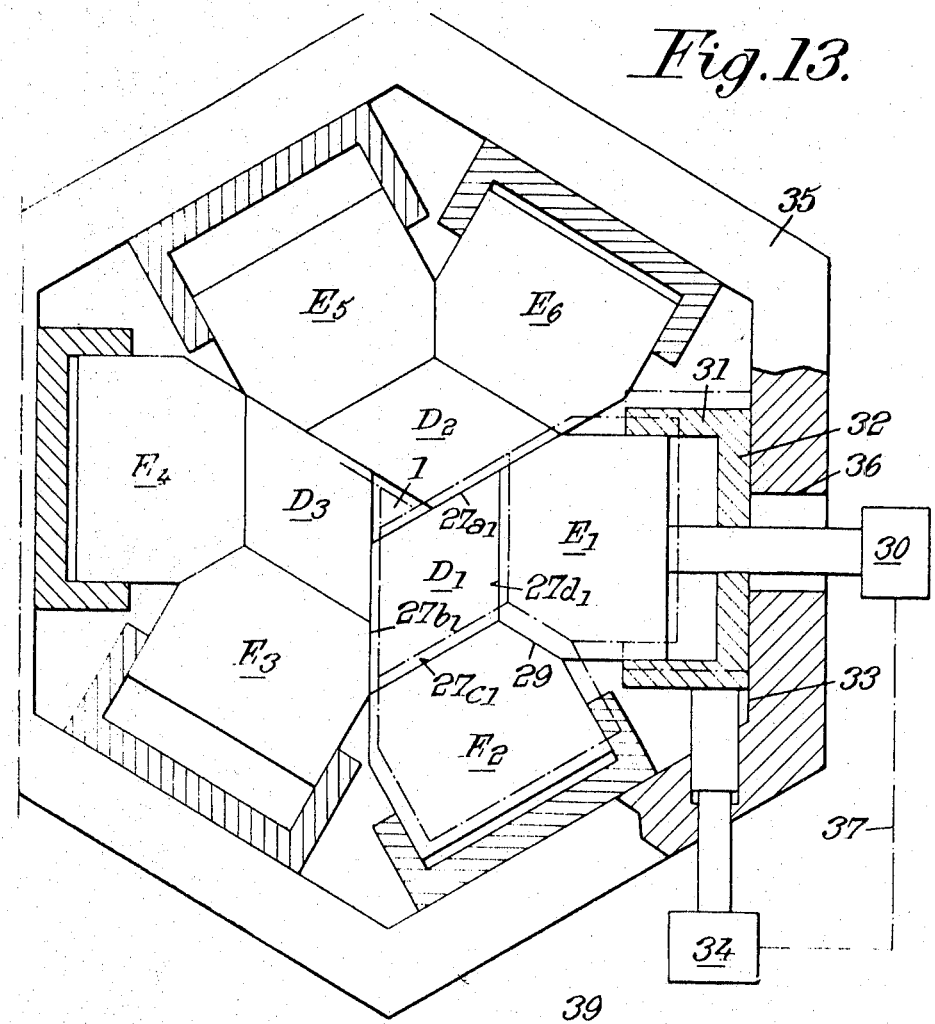
FIG. 13 is a schematic view from above partially in section of an apparatus according to still another embodiment of the invention.

According to another modification of the invention represented in FIG. 13, the wedges having the faces $17a$ delimiting laterally the prismatic closed space, instead of being formed by wedges C of the type described in connection with FIGS. 6 to 8 and adapted to be displaced in a single non radial direction, are formed by wedges D (such as $D_1$, $D_2$ and $D_3$) whose section, in a plane perpendicular to the axis of the sample, has a diamond shape. In the case of FIG. 13, the case in which the closed space has a triangular section has again been envisaged.

Each of these wedges D, such as $D_1$, cooperates with two contiguous wedges by two sliding surfaces $27a_1$ and $27b_1$ parallel to the axis, in a manner analogous to that envisaged in the embodiments represented in FIGS. 6 to 8, the two other faces $27c_1$ and $27d_1$ being subjected to the action of two polyhedral elements or wedges $E_1$ and $E_2$ of large cross-section, having themselves polyhedral ends also in contact with each other by the intermediary of faces 29, parallel to the axis of the closed space, adapted to slide on each other.

The three wedges $D_1$, $D_2$ and $D_3$ (hereafter designated collectively by "wedges D") are thus subjected to the action of six wedges $E_1$ to $E_6$ (which, when envisaged collectively will be designated by "wedges E") whose faces of sliding contact 29, parallel to the axis, form angles of 60° with each other.

As represented, the wedges E are subjected to the action of forces acting in two different directions. The resultants of these forces produce relative displacements of the wedges D in the directions producing a reduction of the section of the central space 1.

The displacements of the wedges E are advantageously achieved with the aid of the means shown in FIG. 13. Their displacements in a first direction, in particular perpendicular to their faces of application on the corresponding wedges D, are obtained, for example, with the aid of jacks schematically shown at 30, the wedges E being guided like pistons in guiding elements 31 playing the role of cylinders, the thrust elements of these jacks 30 passing through the back 32 of the driving elements 31.

Their displacements in a second direction, perpendicular to the first, are advantageously obtained by providing the backs 32 of these guiding elements 31 with external sliding surfaces adapted to be displaced on the guiding surfaces 33 under the action, for example, of jacks, schematically represented at 34, exerting on these elements 31 thrusts in the directions parallel to these guiding surfaces. These guiding surfaces form a hexagonal prism advantageously carried by the same frame 35, this frame 35 comprising openings 36 disposed in a manner such that they permit the thrust elements of the jacks 30 to be displaced transversely simultaneously with the elements 31 forming the cylinder, by the intermediary of conventional synchronization devices indicated schematically by a dashed line 37.

The coordination of the movements of the jacks 30 and 34 respectively for all the wedges E, by the intermediary of simple mechanical dividing devices (the different movements taking place in constant ratios of displacement) permits the effective compression of a sample placed in the central closed space 1, by the intermediary of relative displacements between a first position of the different wedges of the apparatus represented in solid lines and a second position represented in dashed line, it will be noted that the wedges E control the displacements of the wedges D.

In all the embodiments of the apparatus, according to the invention, which have just been described, it is necessary to avoid play between the sliding contact faces of the different wedges capable of relative displacements, in directions different from the directions of the planes of sliding.

To the extent that the wedges exerting the compression on the sample in the closed space are urged further into the regions nearest to the sample, a slight correction can be provided to the profiles of these wedges, such as a slightly larger section of their truncated surfaces of contact with the sample compressed in the closed space, so as to create, during the application of the pressure, a stress distribution producing a more intense gripping of the internal parts of the wedges.

In the first embodiments envisaged (FIGS. 2 and 3), the angle α formed between the faces of the wedges A can be slightly smaller than the corresponding angle α for the wedges B.

It is also necessary that these pieces are not deformed under the effect of torques and of forces to which they are subjected.

Figure 12:
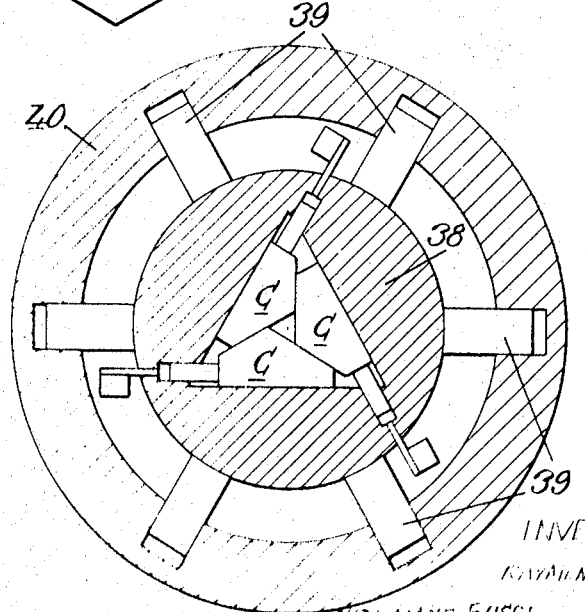
FIG. 12 is a transverse schematic section of a device advantageously associated with the apparatus of FIGS. 6 and 7.

Thus, in the case of the embodiments of the apparatus according to the invention, represented in FIGS. 6 to 11 and 13, it is important that the guiding surfaces not only assure the guiding of the wedges during their simultaneous relative dislacements, but also that they help to maintain these wedges in these positions of sliding with respect to each other. It is then indispensable to assure the rigidity of these guide-surfaces and for this purpose the embodiment of FIG. 12 can advantageously be used in relation, for example, with the embodiments of FIGS. 6 and 7.

These guiding surfaces then form part of a first frame 38, for example cylindrical, subjected to the action of the thrust elements 39 distributed schematically around this frame, jacks being mounted in a second peripheral frame 40.

These jacks are then used to maintain the internal frame 38 rigid, the deformations of the external frame 40 being unimportant provided that they in no case cause the elastic limit of these constituent elements to be exceeded.

Apparatuses are thus obtained having numerous advantages, in particular the possibility of producing very high pressures exceeding 100,000 atmospheres and which can reach 200,000 atmospheres inside a sample of variable volume without limiting their practical use and without preliminary extrusion of the material placed in the closed space of the apparatus, these advantages being sufficiently clear from the foregoing that no further discussion is necessary in this connection.

However it is appropriate to mention, simply by way of illustrative example, that in an apparatus of the type shown in FIG. 2, formed with four wedges of tungsten carbide having 3% cobalt having a resistance to compression equal to 430 kgs./mm.$^2$, pressures can be reached which can vary between the approximate values of 94 and 137 kilobars, according to the hardening treatment undergone by the wedges.

With an apparatus having eight wedges of the type shown in FIG. 3 cooperating with end blocks such as schematically shown in FIGS. 4 and 5 and using wedges of tungsten carbide including 5% cobalt having a resistance to compression equal to 600 kgs./mm.$^2$, a pressure of 220 kilobars can be reached.

It can also be indicated solely to give an idea, that the ratio, for example in experimental apparatus of the type shown in FIG. 2, of the area of the cross-section of the wedges in the region where they cease to mutually support each other to the area of the surfaces $a$ or $b$ can vary from 5 to 10, it being naturally understood that these values are in no way limiting and can vary as a function of the different factors of use of the apparatus, in particular the choice of the material forming these wedges.

The present invention thus provides useful apparatus for subjecting materials to high pressures. To cite only a few of these uses, it can be mentioned that the apparatus can be used in the fabrication of very hard materials in which initial materials are appropriately compressed, for example the fabrication of artificial diamonds by the compression of graphite in the presence of appropriate catalysts. More generally this apparatus is particularly suitable, due to the very high pressures which it generates, for investigating the physical and chemical properties of bodies under high pressures, for example for demonstrating the different transition phases of various materials such as metals or alloys.

These and other uses of high pressures generating apparatuses are known and described in the prior art (such as for example in the Kirk-Othmer Encyclopedia of Chemical Technology—second edition), which is incorporated herein by reference.

In a general manner, while the above description discloses preferred embodiments of the invention, it should be well understood that the invention is not limited thereto as there might be changes made in the arrangement, disposition and form of the parts without departing from the present invention.

We claim:
1. Apparatus for subjecting material contained in a closed space of determined initial volume to very high pressures comprising:
  at least three movable wedges having surfaces delimiting, at least in part, said closed space, each said wedge having two contact faces by which said wedge is contiguous respectively with two other of said wedges, said two contact faces of each wedge diverging from each other towards the exterior of the apparatus.
  thrust means adapted to apply to said wedges forces producing simultaneous relative displacements of said wedges by sliding of their respective contact faces on one another, the orientations of said forces and the angles of the wedges being such that said simultaneous relative displacements produce a reduction of volume of said closed space,
  said wedges being guided so that during said simultaneous relative displacements, each said sliding contact face remains rigorously parallel to the plane initially containing said sliding contact face,
  said wedges mutually supporting each other laterally along zones of effective contact of said contact faces of contiguous wedges, said zones of effective contact extendng to a distance sufficiently far from said closed space so that the parts of said wedges exterior to the mutually laterally supported parts have dimensions, in planes substantially tranverse to the respective directions of displacement of said wedges, sufficient to permit said exterior parts to resist the stresses to which they are subjected under the effect of said forces, the wedges of a first group and of a second group alternating with each other and being formed by a plurality of movable wedges of polyhedral shapes radially distributed about an axis, and in which said sliding contact faces of said wedges, which permit the relative displacements of said wedges, converge towards said axis and are situated in planes parallel to said axis, said wedges being compressed between two terminal, parallel plates gripped by a press, the angles formed by said faces of sliding contact of each wedge being equal from one wedge to another, each of said wedges comprising a small base, defining one of the walls of said closed space, the bases of the wedges of the first group having a surface area greater than the surface area of the wedges of the second group.

2. Apparatus according to claim 1 wherein said terminal plates are themselves formed, on the one hand, by a certain number of contiguous fixed wedges in direct contact along radial faces, said fixed wedges having, in addition, surfaces which, taken together, define a conical or pyramidal surface, and on the other hand, by a conical or pyramidal part complementary to said surface and applied against said surface under the effect of the thrust of a press.

3. In an apparatus for subjecting material contained in a closed space of determined initial volume to very high pressures, including movable wedges, each of which has a surface delimiting in part said closed space and faces diverging from one another towards the exterior of the apparatus in slidable contact with corresponding diverging faces of adjacent wedges, thrust means for applying to said wedges simultaneous relative displacements by the sliding of their respective contact faces on one another, the zones of effective contact of said contact faces extending to a distance sufficiently far from said closed space so that the exterior laterally unsupported parts of the wedges have dimensions, in planes substantially transverse to the respective directions of displacement of said wedges, sufficient to permit said exterior parts to resist the stresses to which they are subjected under the effect of said forces; the improvement wherein the movable wedges are distributed in a first group and a second group, the wedges of the first group being adapted to advance towards the center of said closed space and the wedges of the second group being adapted to move away from said center in the course of said relative displacements, and the angles formed between the contact faces and the direction of displacement of each wedge, on the one hand, and the value of the surface of the same wedge delimiting in part said closed space, on the other hand, being such that the sum of the reductions of the volume of the closed space resulting from the advance of the wedges of the first group are greater than the sum of the increases of the volume of the same closed space resulting from the concomitant movement of the wedges of the second group.

4. Apparatus according to claim 3 characterized by the fact that the wedges of the first group and of the second group alternate with each other and are formed by a plurality of movable wedges of polyhedral shapes radially distributed about an axis, and in which said sliding contact faces of said wedges, which permit the relative displacements of said wedges, converge towards said axis and are situated in planes parallel to said axis, said wedges being compressed between two terminal, parallel plates gripped by a press.

5. Apparatus according to claim 3 wherein the wedges of the first group comprise surfaces which delimit in part said closed space forming a prism and faces of slidable mutual contact extending in the planes of said surfaces, said planes forming equal angles with one another, and the wedges of the second group are formed by two opposite wedges having pyramidal parts oriented toward the center of the prism is slidable contact with the wedges of the first group along complementary inclined truncated faces formed on the same and intersecting on the axis of the prism, the apparatus further including means for guiding the wedges of the first group such that, under the action of the thrust means, the wedges are simultaneously displaced in directions parallel respectively to planes passing through the axis of said prism.

6. Apparatus according to claim 5 wherein the first group comprises three wedges whose mutual contact faces form 60° angles with one another.

References Cited

UNITED STATES PATENTS

| 3,384,926 | 5/1968 | Tsujii. |
| 2,064,965 | 12/1936 | Will. |
| 3,271,502 | 9/1966 | Wentorf. |
| 3,300,200 | 1/1967 | Allan et al. |

FOREIGN PATENTS

| 558,615 | 7/1957 | Belgium. |

H. A. KILBY, JR., Primary Examiner